UNITED STATES PATENT OFFICE.

JOHN C. WHITMAN, OF SUGAR CREEK TOWNSHIP, VENANGO COUNTY, PENNSYLVANIA, ASSIGNOR OF ONE-HALF TO HERBERT G. WHITMAN, OF FRANKLIN, PENNSYLVANIA.

FILTRATION OF PETROLEUM-OIL.

1,312,375.  Specification of Letters Patent.  Patented Aug. 5, 1919.

No Drawing. Application filed February 12, 1919. Serial No. 276,649.

*To all whom it may concern:*

Be it known that I, JOHN C. WHITMAN, citizen of the United States, residing at Sugar Creek township, in the county of Venango and State of Pennsylvania, have invented certain new and useful Improvements in the Filtration of Petroleum-Oil, of which the following is a specification.

This invention relates to the art of refining petroleum, and more especially to the filtration step.

The objects of the invention are to increase the efficiency of filtration, to expedite the same, and to reduce the cost thereof.

Filtration forms one step in nearly every process of refining petroleum, and this step together with the medium employed is substantially the same in all refineries.

In earlier days of refining, bone-black was the principal filtering medium employed and it is still employed, to a comparatively limited extent in some branches of refining, especially in the production of the higher grades of vaseline and the medicinal oils; but for general refining purposes, bone black has been largely displaced by a more readily-obtainable substance which is commercially known as fullers' earth, the supply of which, so far as applicant is informed, is produced in Florida.

In the utilization of either of the filtering mediums above mentioned, the filter is first filled with the medium, and the crude, or partially refined petroleum, as the case may be, is caused to pass through the same, and owing to the particular characteristics of either of said mediums, it is necessary to cause the oil to percolate or pass through the same very slowly, as, otherwise, considerable quantities of substance or substances it is desired to eliminate, will remain in or be carried along with the fluid.

When this filtering medium becomes impregnated, to a certain degree with the substances removed thereby from the fluid, its efficiency becomes thereby lowered, and said medium is then removed from the filter and is subjected to the action of heat,— usually by bringing the same into contact with a flame—in a kiln especially constructed for this purpose, and said filtering medium is thereby purified and brought to substantially its original condition, and is again ready for use. This purification by heat and reuse of the filtering medium is repeated many times, and, of course, more often in the case of fullers' earth than of of bone-black since fullers' earth is the more refractory material.

Turning now, to my invention, I have discovered that the crude mineral commonly known as bog ore, or bog iron ore, may be employed in its crude state as a filtering medium in refining petroleum oils with a decided advantage in its action, and improvement in results obtained, especially in the following particulars:

1. The fluid may be passed through the bog ore with greater rapidity.

2. A larger quantity of fluid may be passed through the same before it becomes necessary to purify the same, that is to say, it has a greater capacity for containing and retaining the removed impurities.

3. It may be passed through the purifying furnace with greater rapidity,—it is more easily purified.

4. It does not require so high a degree of heat to purify it.

5. Its cost, in the locality of Franklin, Pa., is about one-sixth that of fullers' earth, and less than one-tenth that of bone black.

6. It is abundant in many parts of the United States.

Summarizing these advantages it will be perceived that the refining of petroleum oils by the use of bog iron ore is much cheaper and much more expeditious than when either bone black or fullers' earth is employed.

In practising my invention, wherever it is desired to filter the petroleum oil, either as a single filtration step by itself or as a step in a refining process which includes filtration as one of its steps, the bog iron ore is employed as a filtration bed or medium in the same way as fullers' earth has heretofore been employed.

I claim the following:

In the treatment of petroleum oil, the step which consists in passing the oil through a filter bed of bog-iron ore.

In testimony whereof I affix my signature in presence of two witnesses.

JOHN C. WHITMAN,

Witnesses:
J. P. GROSSMAN,
M. R. HENDERSON.